June 18, 1940.   F. HINRICHS ET AL   2,204,856
SANITARY VALVE
Filed Feb. 25, 1939

INVENTORS
Ferdinand Hinrichs
George N. Sery
BY
Morsell Lieber & Morsell
ATTORNEYS.

Patented June 18, 1940

2,204,856

UNITED STATES PATENT OFFICE 2,204,856

SANITARY VALVE

Ferdinand Hinrichs and George N. Sery, Kenosha, Wis., assignors to Tri-Clover Machine Company, Kenosha, Wis., a corporation of Wisconsin Application February 25, 1939, Serial No. 258,380

3 Claims. (Cl. 251—50)

This invention relates to improvements in sanitary valves.

Heretofore valves of the type with which the present invention is concerned have been constructed with conventional packing along the stem positioned in an enlarged bore portion of a surrounding bonnet, and held in place by a gland nut threaded into said threaded enlarged bore portion. This arrangement is very objectionable for use in connection with milk pasteurizing equipment, and for use in other places where a high degree of sanitation is required because daily removal of the packing for cleaning or replacement is difficult, and because the internal threading for the gland nut, as well as the pocket formed by the enlarged bore, are objectionable and troublesome to properly clean. The conventional valve is furthermore undesirable because the actuating threads are internal, forming a multitude of grooves within which food products may lodge and cause contamination. Also, in the usual valve of this type, the valve stem rotates during actuation, resulting in an objectionable galling action when the valve is seating.

It is a general object of the present invention to provide an improved sanitary valve wherein no gland nut is needed, and wherein the bonnet has a smooth, straight, unthreaded bore of uniform diameter, there being an improved valve packing movable with the valve stem for suitable cooperation with the straight bore of the bonnet.

A further object of the invention is to provide in a valve a novel packing construction, which permits quick removal of the packing for cleaning or replacement of said packing and for cleaning of the valve stem, and which permits quick removal of all other parts of the valve whereby a high degree of sanitation may be maintained.

A more specific object of the invention is to provide in a valve a stem of special construction for removably retaining circular packing means on a particular part of said stem.

A further object of the invention is to provide a sanitary valve wherein the actuating threads are external.

A still further object of the invention is to provide a valve wherein the valve-actuating member rotates independently of the valve stem so that only longitudinal movement is transmitted to said stem to prevent rotation of the valve and objectionable galling action when the valve is seating.

A still further object of the invention is to provide in a valve means for securing the bonnet to the valve body extension whereby internal threading in said extension is eliminated.

With the above and other objects in view the invention consists in the improved sanitary valve and all its parts and combinations as set forth in the claims and all equivalents thereof.

In the accompanying drawing illustrating preferred embodiments of the invention, in which the same reference numerals designate the same parts in all the views.

Figure 1:
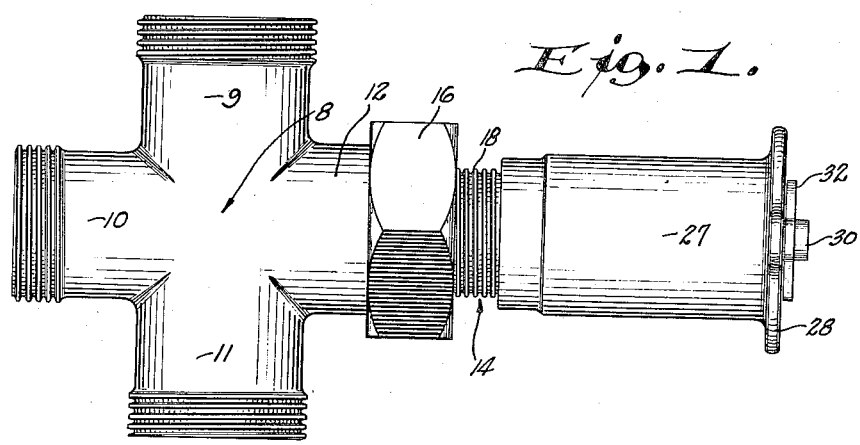
Figure 1 is a plan view of the improved valve.

Referring more particularly to the drawing, the numeral 8 designates the valve body, and said body may have a plurality of extensions 9, 10, and 11 for connection with conduits or pipes to be associated therewith. The valve body is also provided with a tubular valve extension 12 which is externally threaded, as at 13.

A valve bonnet 14 is formed with an annular shoulder 15 at an intermediate point in its length for cooperation with the end of the body extension 12, and a union nut 16 threaded on the threads 13 of the extension is cooperable with the shoulder 15 of the bonnet to maintain the bonnet in assembled position. A portion of the bonnet projects into the valve body extension 12, as at 17, and the rest of the bonnet projects outwardly and is externally threaded, as at 18. The bore 19 of the bonnet is smooth, straight, unthreaded, and of uniform diameter throughout the length of the bonnet whereby there are no pockets or threading within which food products may lodge.

Figure 2:
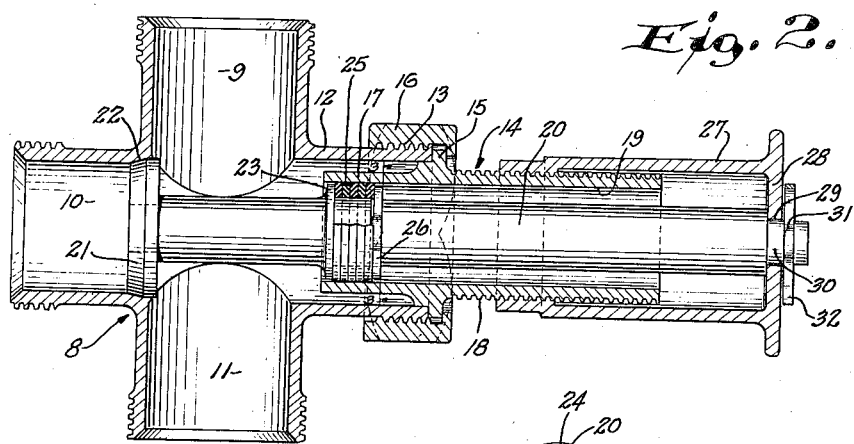
Figure 2 is a longitudinal sectional view showing the valve in closed condition, part of the packing being broken away and shown in section.
Figure 7:
Figure 7 is a plan view of the spring clip for removably locking the actuating handle to the upper end of the valve stem.

Extending through the bore 19 of the bonnet and into the valve body is a valve stem 20 having a valve 21 at its inner end, which is cooperable with a valve seat 22 in the manner shown in Figure 2. An intermediate portion of the valve stem is formed with an annular shoulder 23, and spaced outwardly from said shoulder is an annular groove or under-cut 24. Suitable packing means, surrounding the valve stem and retained against movement in one direction relative to the valve stem by the shoulder 23, is adapted to be retained against movement in the other direction relative to the valve stem by removable means coacting with the valve stem to confine the packing between it and the shoulder 23. The packing may consist of a plurality of rings 25 of rubber, paper, or other relatively pliable material suitable for packing purposes. The packing may also consist of a single member having a normal length substantially equal to the length of the plurality of rings 25 along the valve stem. Various means cooperable with the valve stem may be employed to lock the packing in position, but it is preferred to employ a removable collar with suitable means for normally retaining the collar in position. By employing a U-shaped metal clip 26 of such thickness that it may enter the groove 24 on the valve stem, the purpose is well accomplished. The U-shaped clip is preferably circular in shape and is of less diameter than the exterior diameter of the packing. The length of the packing longitudinally of the valve stem is preferably slightly greater than the distance between the shoulder 23 and the groove 24.

Figures 3, 4, 5:
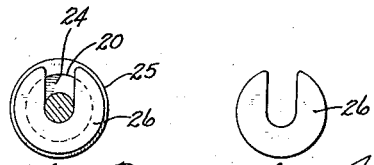
Figure 3 is a transverse sectional view through the valve stem taken on the line 3—3 of Figure 2.
Figure 4 is a plan view of the packing retaining clip alone.
Figure 5 is a fragmentary view of the valve stem with the packing removed therefrom.

Thus, when the clip 26 is inserted in position, as shown in Figures 2 and 3, the packing is compressed somewhat in a longitudinal direction, and the clip is automatically held in place because of said compressed condition. The packing is so located on the valve stem that when the valve is closed the packing is still within the bonnet 14 so that a liquid seal is maintained between the valve stem and the bore of the bonnet.

A tubular actuating handle 27 is threaded outside of the bonnet 14, and said handle has a closed end 28 formed with a central opening 29 through which a reduced outer end portion 30 of the valve stem projects, the end 28 of the actuating handle, however, seating upon the larger diameter portion of the end of the valve stem. The projecting portion 30 of the valve stem is under cut outwardly of the end 28, as at 31, and a spring clip 32 of hairpin or other suitable form is removably engageable with the under-cut portion 31 to retain the actuating handle against outward movement with respect to the valve stem.

It is to be noted that the connection between the actuating handle and the valve stem is such that only longitudinal movement and no rotating movement is transmitted to the valve stem because the actuating handle can rotate around the valve stem portion 30. Thus, during actuation of the valve the valve does not rotate, and no objectionable galling action can take place while the valve is seating.

The operation of the valve is apparent in that when the handle is turned in an outward direction, it will pull the valve stem with it to move the valve 21 away from the seat 22, the packing 25 being drawn along with the valve stem in the bore 19 of the bonnet, and maintaining a liquid seal. To close the valve the actuating handle is turned in a reverse direction.

The valve is so constructed that it may be quickly disassembled for cleaning purposes. This is accomplished by removing the clip 32 and unthreading the actuating handle; by removing the union nut 16; by removing the bonnet from the valve stem; and then by removing the valve stem and valve from the valve body, the valve 22 being of such diameter that it can be withdrawn through the body extension 12.

It is apparent that the actuating threads 18 on the bonnet are all external, and that the bore of the bonnet is straight, unthreaded, and of uniform diameter whereby the bonnet may be easily cleaned. The valve packing may be quickly removed for cleaning or replacement by driving the clip 26 out of the groove 24, and by slipping the packing rings off of the valve stem. This makes it entirely practical to use a single service paper packing, which can be thrown away and replaced daily. When the clip 26 and packing are removed from the valve stem, the valve stem may be readily cleaned in a thorough manner.

By having the bonnet formed with the annular flange 15, and by employing a union nut 16 for cooperation with said flange to secure the bonnet to the valve body, the necessity for internal threading in the extension 12 is eliminated.

Figure 6:
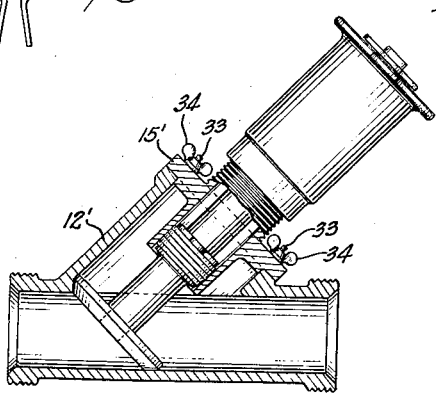
Figure 6 is a view showing the use of the valve in connection with another type of valve body, part being shown in longitudinal section.

In Figure 6, wherein a Y valve body is illustrated, the valve extension 12' is too short on one side for the use of a union nut to hold the bonnet in place. Substantially the same method of attachment can be effected, however, by having bolts 33 projecting from the end of the extension 12' that cooperate with holes in the flange 15' of the bonnet, and by securing the bonnet in position by the use of wing nuts 34.

Various changes and modifications may be made without departing from the spirit of the invention, and all of such changes are contemplated as may come within the scope of the claims.

What we claim is:

1. In a valve having a longitudinally movable valve stem formed with a shoulder on an intermediate portion thereof and formed with a transversely grooved part spaced from said shoulder, a bonnet having a straight bore portion within which said stem moves, packing surrounding said valve stem and retained against movement in one direction with respect to the valve stem by said shoulder and coacting with said straight bore portion of the bonnet to form a liquid seal between the stem and bonnet, and means removably engageable with said grooved part of the valve stem on the other side of said packing for preventing movement of said packing in the other direction with respect to said valve stem, the space between said shoulder and said groove part of the valve stem being slightly less than the normal length of said packing whereby the packing is retained in compressed condition.

2. In a valve having a longitudinally movable valve stem formed with a shoulder on an intermediate portion thereof, a bonnet having a straight bore portion within which said stem moves, packing surrounding said valve stem and retained against longitudinal movement in one direction on the valve stem by said shoulder and coacting with the straight bore portion of the bonnet to form a liquid seal between the stem and bonnet, and means for retaining the packing against longitudinal movement in the other direction on the valve stem, said valve stem having means cooperable with said retaining means to removably receive the same when it is moved transversely of the valve stem into retaining position, said retaining means being so spaced from the shoulder with respect to the length of the packing that the packing is retained in compressed condition.

3. In a valve having a longitudinally movable valve stem formed with a shoulder on an intermediate portion thereof, a bonnet having a straight bore portion within which said stem moves, packing surrounding said valve stem and retained against longitudinal movement in one direction on the valve stem by said shoulder and coacting with the straight bore portion of the bonnet to form a liquid seal between the stem and bonnet, and means for retaining the packing against longitudinal movement in the other direction on the valve stem, said valve stem having means cooperable with said retaining means to removably receive the same when it is moved transversely of the valve stem into retaining position, the removable retaining means being on the outer side of the packing so as to be out of contact with fluid passing through the valve.

FERDINAND HINRICHS.
GEORGE N. SERY.